United States Patent
Chang et al.

(10) Patent No.: US 9,740,334 B2
(45) Date of Patent: Aug. 22, 2017

(54) OPTICAL TOUCH SYSTEM AND CONTROL METHOD

(71) Applicant: Wistron Corporation, New Taipei (TW)

(72) Inventors: Chih-Hsiung Chang, New Taipei (TW); Yi-Shu Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 162 days.

(21) Appl. No.: 14/188,701

(22) Filed: Feb. 25, 2014

(65) Prior Publication Data

US 2015/0077397 A1   Mar. 19, 2015

(30) Foreign Application Priority Data

Sep. 18, 2013   (TW) .............................. 102133923 A

(51) Int. Cl.
*G06F 3/042*   (2006.01)
*G06F 3/041*   (2006.01)

(52) U.S. Cl.
CPC ............ *G06F 3/042* (2013.01); *G06F 3/0416* (2013.01); *G06F 2203/04104* (2013.01)

(58) Field of Classification Search
CPC .................. G06F 3/042; G06F 3/0416; G06F 2203/04104
See application file for complete search history.

(56) References Cited

U.S. PATENT DOCUMENTS

| | | | |
|---|---|---|---|
| 2010/0083109 A1* | 4/2010 | Tse .......................... | A63F 13/10 715/702 |
| 2011/0175827 A1* | 7/2011 | Bogue ................... | G06F 3/0416 345/173 |
| 2012/0224054 A1 | 9/2012 | Ogawa | |

FOREIGN PATENT DOCUMENTS

| CN | 102473062 A | 5/2012 |
|---|---|---|
| CN | 103186310 A | 7/2013 |

OTHER PUBLICATIONS

Office action dated Dec. 28, 2016 for CN application No. 201310454381.6, pp. 3-5.

* cited by examiner

*Primary Examiner* — Matthew Sim
(74) *Attorney, Agent, or Firm* — Winston Hsu

(57) ABSTRACT

An optical touch system includes a plurality of touch devices and an electronic device. The electronic device includes a touch display unit configured to generate a plurality of touch points when the plurality of touch devices are contacted thereon, a control unit configured to divide the plurality of touch devices into a plurality of groups according to characteristics of the plurality of touch devices to control or handle operations of the plurality of groups in time division, an optical device configured to obtain images corresponding to touch points generated by touch devices in one of the plurality of groups, and a calculating unit configured to receive the images obtained by the optical device to calculate positions of the touch points corresponding to the images.

17 Claims, 7 Drawing Sheets

OPTICAL TOUCH SYSTEM AND CONTROL METHOD

BACKGROUND OF THE INVENTION

1. Field of the Invention

The present invention relates to an optical touch system and an optical touch control method, and more particularly, to an optical touch system and an optical touch control method which accelerate calculation and simplify computational complexity.

2. Description of the Prior Art

As technologies have developed flourishingly in recent years, all kinds of portable electronic products have widely occupied entire modern consumer electronic products market, and portable electronic products such as personal digital assistants, smart phones and mobile phones are generally equipped with touch devices as interfaces for data communication. Consequently, a display panel of a touch device has gradually become one of the key components in various electronic products. According to the applied mechanism, conventional touch control technologies basically comprise a resistive type, a capacitive type, an ultrasonic type, an infrared type, an optical imaging type touch control technology and so on, which can be applied in various fields. For example, the optical imaging type touch control technology utilizes two image capturing modules (such as cameras) placed at two corners of the display panel for detecting a position of an object on the display panel, which shows up as a shadow. Then, the position of the object on the display panel is located by triangulation. As a result, with advantages of excellent accuracy, high transmission rate, great reliability, low damage rate, affordability and multi-touch operation, the optical imaging type touch control technology, compared to resistive type or capacitive type touch control technology, is especially suitable for display panels of large or medium size. However, although calculation errors seldom come up in current optical touch system for one single touch device, shielding and ghost issues often occur in the optical touch system as a number of touch devices glows. Therefore, handling more touch devices while preventing a rise in computational complexity and an occurrence of calculation errors has become a main objective in the field.

SUMMARY OF THE INVENTION

It is therefore an objective of the present invention to provide an optical touch system and an optical touch control method so as to prevent an occurrence of calculation errors and reduce computational complexity.

An embodiment of the invention provides an optical touch system including a plurality of touch devices and an electronic device. The electronic device includes a touch display unit configured to generate a plurality of touch points when the plurality of touch devices are contacted thereon, a control unit configured to divide the plurality of touch devices into a plurality of groups according to characteristics of the plurality of touch devices to control or handle operations of the plurality of groups in time division, an optical device configured to obtain images corresponding to touch points generated by touch devices in one of the plurality of groups, and a calculating unit configured to receive the images obtained by the optical device to calculate positions of the touch points corresponding to the images.

Another embodiment of the invention further provides an optical touch control method for an electronic device of an optical touch system. The optical touch control method includes dividing a plurality of touch devices into a plurality of groups according to characteristics of the plurality of touch devices of the optical touch system, obtaining images corresponding to touch points generated by the plurality of touch devices in the plurality of groups on the electronic device in time division, and calculating positions of the touch points corresponding to the images according to the images obtained in time division.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
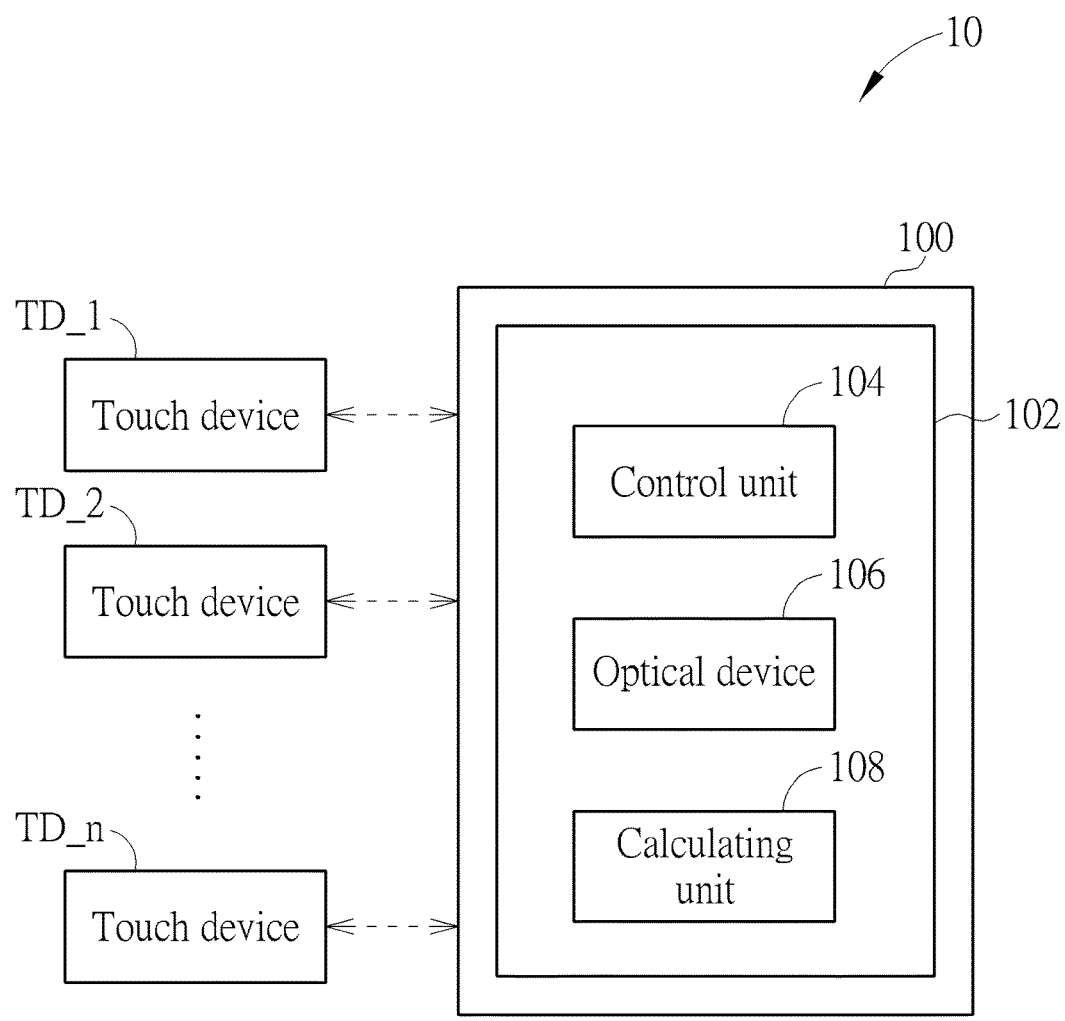
FIG. 1 is a schematic diagram illustrating an optical touch system according to an embodiment of the present invention.

Please refer to FIG. 1; FIG. 1 is a schematic diagram illustrating an optical touch system 10 according to an embodiment of the present invention. The optical touch system 10 comprises an electronic device 100 and touch devices $TD\_1$-$TD\_n$. The electronic device 100 comprises a touch display unit 102, a control unit 104, an optical device 106 and a calculating unit 108. The touch display unit 102 is disposed on one side of the electronic device 100 and configured to generate touch points $TP\_1$-$TP\_n$ (not shown in FIG. 1) when the touch devices $TD\_1$-$TD\_n$ contact the touch display unit 102. The optical device 106 such as a camera is configured to capture images of the touch points $TP\_1$-$TD\_n$ (for example, light spots or shadows). Subsequently, the calculating unit 108 receives the images of the touch points $TP\_1$-$TD\_n$ and calculates positions of the touch points $TP\_1$-$TP\_n$ accordingly. However, in order to accelerate calculation and simplify computational complexity, the control unit 104 may have divided the touch devices $TD\_1$-$TD\_n$ into a plurality of groups according to characteristics of the touch devices $TD\_1$-$TD\_n$ in advance, such that the optical device 106 and the calculating unit 108 can control or handle operations of each of the groups in time division.

Figure 2:
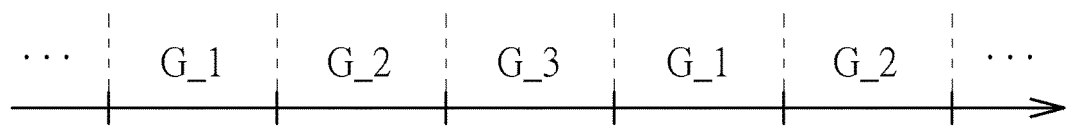
FIG. 2 is a schematic diagram illustrating operations of the optical touch system in time division according to an embodiment of the present invention.

For example, please refer to FIG. 2. FIG. 2 is a schematic diagram illustrating operations of the optical touch system 10 in time division according to an embodiment of the present invention. As shown in FIG. 2, the touch devices $TD\_1$-$TD\_n$ are divided into three groups $G\_1$-$G\_3$. The electronic device 100 operates the touch devices in the groups G_1-G_3 periodically along a timeline X. In other words, the electronic device 100 deals with the touch devices of the different groups at different moments so as to calculate the positions of the touch points generated by the touch devices of each of the groups in time division.

How the control unit 104 divides the touch devices TD_1-TD_n into groups depends on whether the touch devices TD_1-TD_n are able to be identified or controlled by the electronic device 100. To be more specific, if any of the touch devices TD_1-TD_n can be controlled by the electronic device 100, the control unit 104 classifies the touch devices able to be controlled by the electronic device 100 under a group CTL_G1. If any of the touch devices TD_1-TD_n can be identified by the electronic device 100, the control unit 104 classifies the touch devices able to be identified by the electronic device 100 under a group IDTF_G1. In addition, the control unit 104 classifies touch devices unable to be identified nor controlled by the electronic device 100 under a group NON_G1. In addition, a calculating ability limit M of the electronic device 100 is concerned when the control unit 104 divides the touch devices TD_1-TD_n into groups. That is to say, if a number of the touch devices in the group CTL_G1 or a number of the touch devices in the group IDTF_G1 exceeds the calculating ability limit M of the electronic device 100, the control unit 104 further respectively regroups identical or different touch devices of the group CTL_G1 or identical or different touch devices of the group IDTF_G1 into at least one group CTL_G2 or at least one group IDTF_G2 according to the calculating ability limit M. Namely, the number of the touch devices in the group CTL_G1, a number of the touch devices in the group CTL_G2, the number of the touch devices in the group IDTF_G1 or a number of the touch devices in the groups IDTF_G2 should not exceed the calculating ability limit M of the electronic device 100. As to the group NON_G1, merely one group exists. Therefore, if a number of the touch devices in the group NON_G1 exceeds the calculating ability limit M of the electronic device 100, the control unit 104 arbitrarily selects touch devices from the group NON_G1, such that the number of the touch devices in the group NON_G1 does not exceed the calculating ability limit M. In particular, the number of the touch devices in the group NON_G1 meets the calculating ability limit M of the electronic device 100. Moreover, the calculating ability limit M of the electronic device 100 relates to a number of the touch devices which can be simultaneously handled by the electronic device 100. The touch devices which can be simultaneously handled by the electronic device 100 may be identical or different touch devices.

Figure 3A:
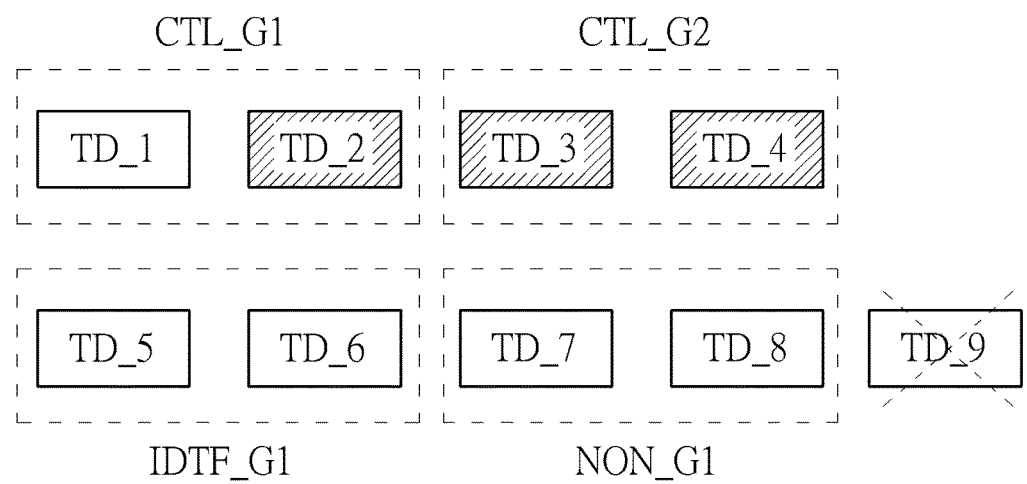
FIGS. 3A and 3B are schematic diagrams respectively illustrating grouping processes of the optical touch system according to an embodiment of the present invention.
Figure 3B:
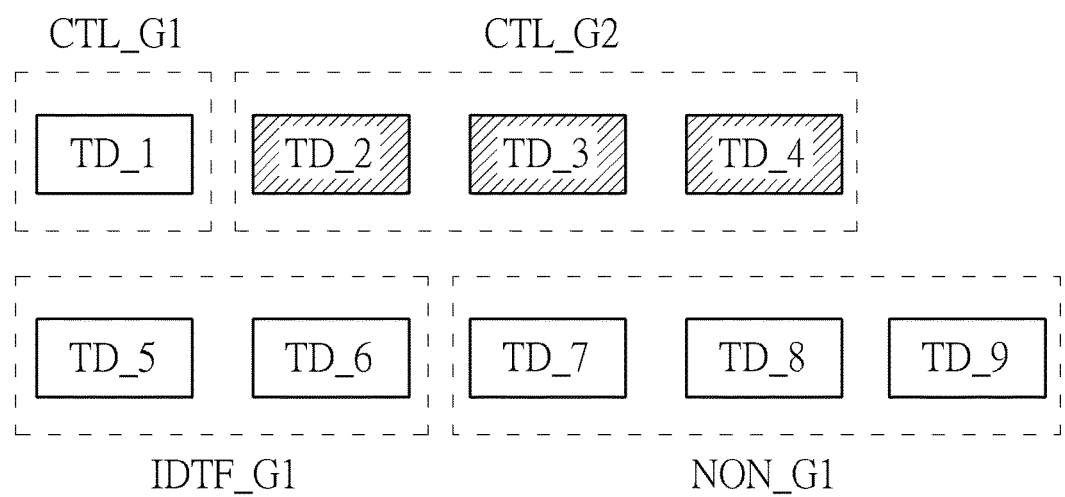

For example, please refer to FIGS. 3A and 3B. FIGS. 3A and 3B are schematic diagrams respectively illustrating grouping processes of the optical touch system 10 according to an embodiment of the present invention. Numbers of touch devices in FIGS. 3A and 3B are both 9, wherein touch devices TD_1-TD_4 are the touch devices able to be controlled by the electronic device 100, the touch devices TD_2-TD_4 are identical, touch devices TD_5-TD_6 are the touch devices able to be identified by the electronic device 100, and the touch devices TD_7-TD_9 are the touch devices unable to be identified nor controlled by the electronic device 100. As shown in FIG. 3A, the calculating ability limit M of the electronic device 100 is 2. According to the above-mentioned characteristics of the touch devices TD_1-TD_9, the control unit 104 may classify the touch devices TD_1-TD_4 under the group CTL_G1, classify the touch devices TD_5-TD_6 under the group IDTF_G1, and classify the touch devices TD_7-TD_9 under the group NON_G1. Since the number of the touch devices in the group CTL_G1 is greater than the calculating ability limit M, the control unit 104 further classifies the touch devices TD_1-TD_2 under the group CTL_G1 and classifies the touch devices TD_3-TD_4 under the group CTL_G2. Besides, since a number of the touch devices in the group NON_G1 comprising touch devices unable to be identified nor controlled by the electronic device 100 is greater than the calculating ability limit M, wherein M=2, the control unit 104 keeps the touch devices TD_7-TD_8 remaining in the group NON_G1, and the touch device TD_9 is discarded.

As shown in FIG. 3B, the calculating ability limit M of the electronic device 100 is 3. According to the above-mentioned characteristics of the touch devices TD_1-TD_9, the control unit 104 may classify the touch devices TD_1-TD_4 under the group CTL_G1, classify the touch devices TD_5-TD_6 under the group IDTF_G1, and classify the touch devices TD_7-TD_9 under the group NON_G1. Since a number of the touch devices in the group CTL_G1 is greater than the calculating ability limit M but a number of the identical touch devices TD_2-TD_4 is smaller than the calculating ability limit M, the control unit 104 may further classify the touch device TD_1 under the group CTL_G1 and classify the touch devices TD_2-TD_4 under the group CTL_G2. Because a number of the touch devices in the group NON_G1 comprising touch devices unable to be identified nor controlled by the electronic device 100 is greater than 1 but is smaller than the calculating ability limit M, the control unit 104 is not required to further regroup the group NON_G1. In addition, since a total number of the touch devices in the group CTL_G1 and the group IDTF_G1 is smaller than the calculating ability limit M, the group CTL_G1 and the group IDTF_G1 may further combine to form one group.

On the other hand, the touch devices TD_1-TD_n may be active or passive touch devices. If the touch devices TD_1-TD_n are passive touch devices, the control unit 104 of the electronic device 100 may merely classify the touch devices TD_1-TD_n according to characteristics of whether the touch devices TD_1-TD_n can be identified by the electronic device 100 or not and controls the optical device 106 to obtain the images of the touch points generated by the touch devices of each group on the touch display unit 102 in time division; then, the calculating unit 108 calculates the positions of the touch points. If the touch devices TD_1-TD_n are active touch devices, the control unit 104 of the electronic device 100 may classify the touch devices TD_1-TD_n according to the characteristic of whether the touch devices TD_1-TD_n can be identified and controlled by the electronic device 100 or not. When the touch devices TD_1-TD_n are active touch devices able to be identified by the electronic device 100, the touch devices TD_1-TD_n are regarded as passive touch devices by the electronic device 100; when the touch devices TD_1-TD_n are active touch devices able to be controlled by the electronic device 100, the control unit 104 of the electronic device 100 may control operations of the touch devices of each group in time division with a wireless connection or with a wired connection, and subsequently positions of touch points generated by the touch devices of each group on the touch display unit 102 are obtained with the optical device 106 and the calculating unit 108. Besides, the touch devices TD_1-TD_n may be a combination of active touch devices and passive touch devices —namely, a portion of the touch devices are active touch devices while a portion of the touch devices are passive touch devices, but not limited thereto. In addition, passive touch devices able to be identified by the electronic device 100 may be realized with barcodes; on the other hand, active touch devices able to be controlled or identified by the electronic device 100 may be light pens emitting light beams of different colors, light pens emitting light beams at different moments (such as light pens twinkling at different frequencies) or light pens transmitting different codes and so on. To support light pens emitting light beams at different moments or light pens transmitting different codes, the electronic device 100 must further be equipped with a separate receiver (for example, an infrared receiver) to receive light signals from the light pens and to identify types of light pens. To realize the light pens transmitting different codes, a portion of the coding region of the light pens is permeable to light and hence forms a structure of barcodes.

Figure 4:
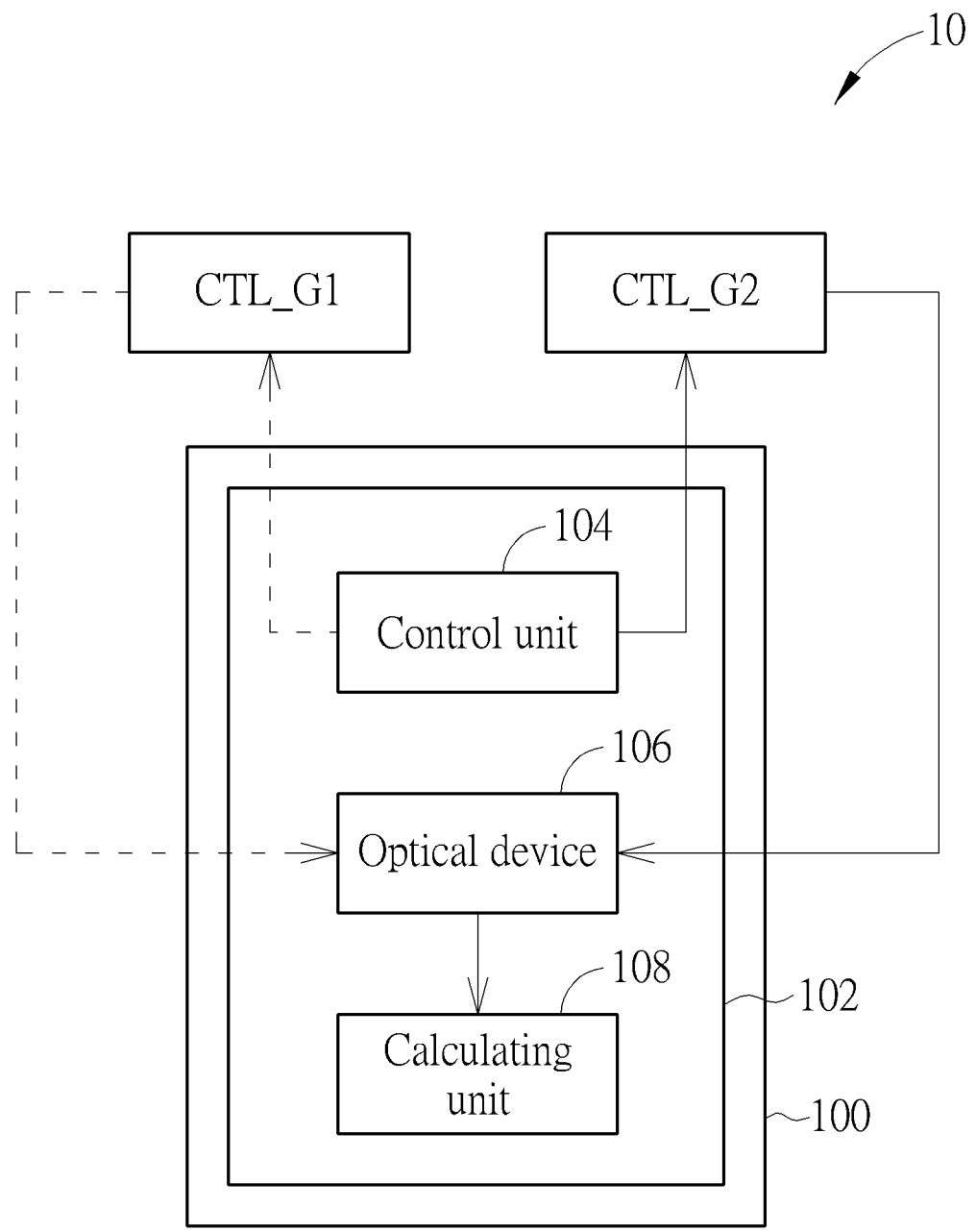
FIG. 4 is a schematic diagram illustrating an active operating procedure of the optical touch system according to an embodiment of the present invention.

Please refer to FIG. 4; FIG. 4 is a schematic diagram illustrating an active operating procedure of the optical touch system 10 according to an embodiment of the present invention. In FIG. 4, the touch devices TD_1-TD_n are active touch devices able to be controlled by the electronic device 100 (not shown in FIG. 4), and are divided into two groups, CTL_G1 and CTL_G2. More specifically, the control unit 104 first makes the touch devices of the group CTL_G1 in normal operation (such as illuminating) when the touch devices of the group CTL_G1 contact the touch display unit 102, and the control unit 104 keeps the touch devices of the group CTL_G2 off. After the optical device 106 captures the images of the touch points generated by the touch devices of the group CTL_G1, the calculating unit 108 calculates the positions of the associated touch points according to the obtained images. Then, the control unit 104 makes the touch devices of the group CTL_G2 in normal operation (such as illuminating) when the touch devices of the group CTL_G2 contact the touch display unit 102, and the control unit 104 keeps the touch devices of the group CTL_G1 off. After the optical device 106 captures the images of the touch points generated by the touch devices of the group CTL_G2, the calculating unit 108 calculates the positions of the associated touch points according to the obtained images.

Figure 5:
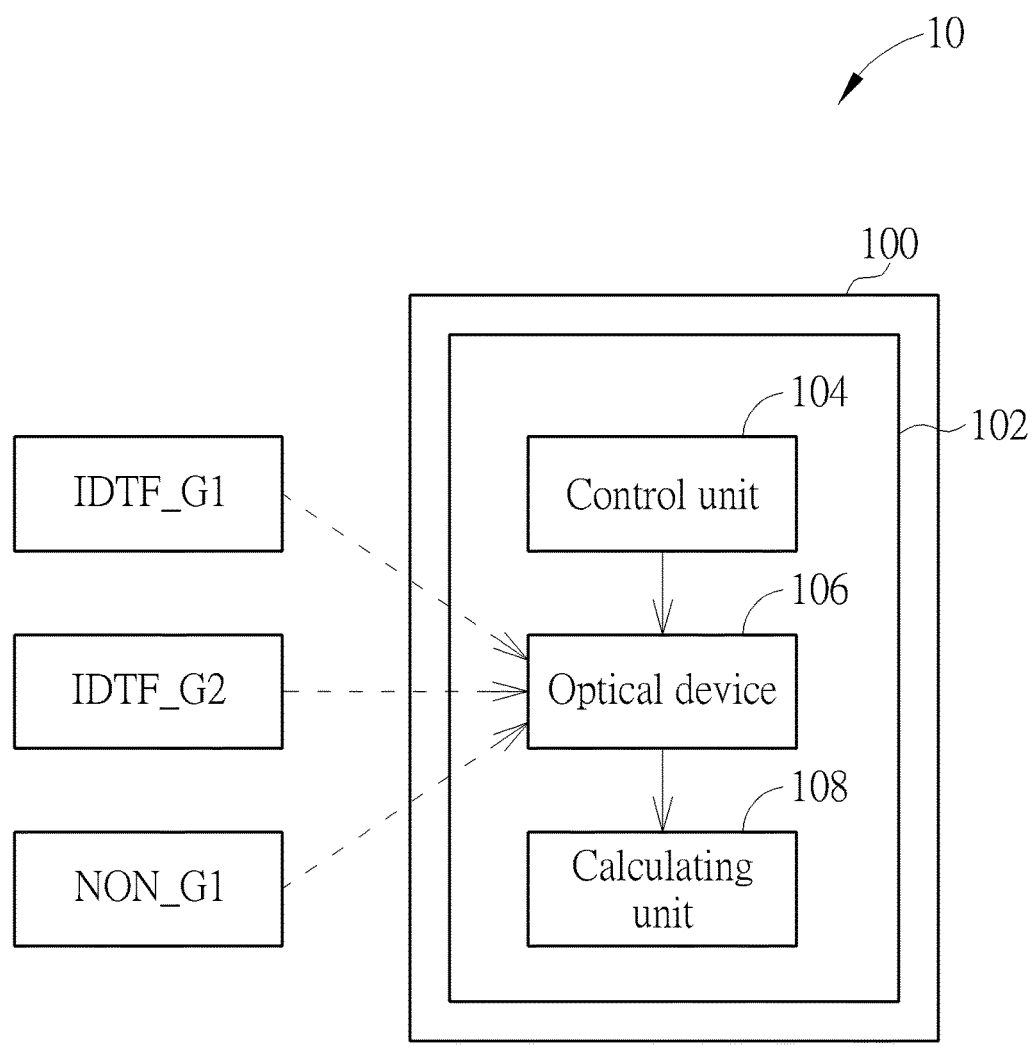
FIG. 5 is a schematic diagram illustrating a passive operating procedure of the optical touch system according to an embodiment of the present invention.
Figure 6:
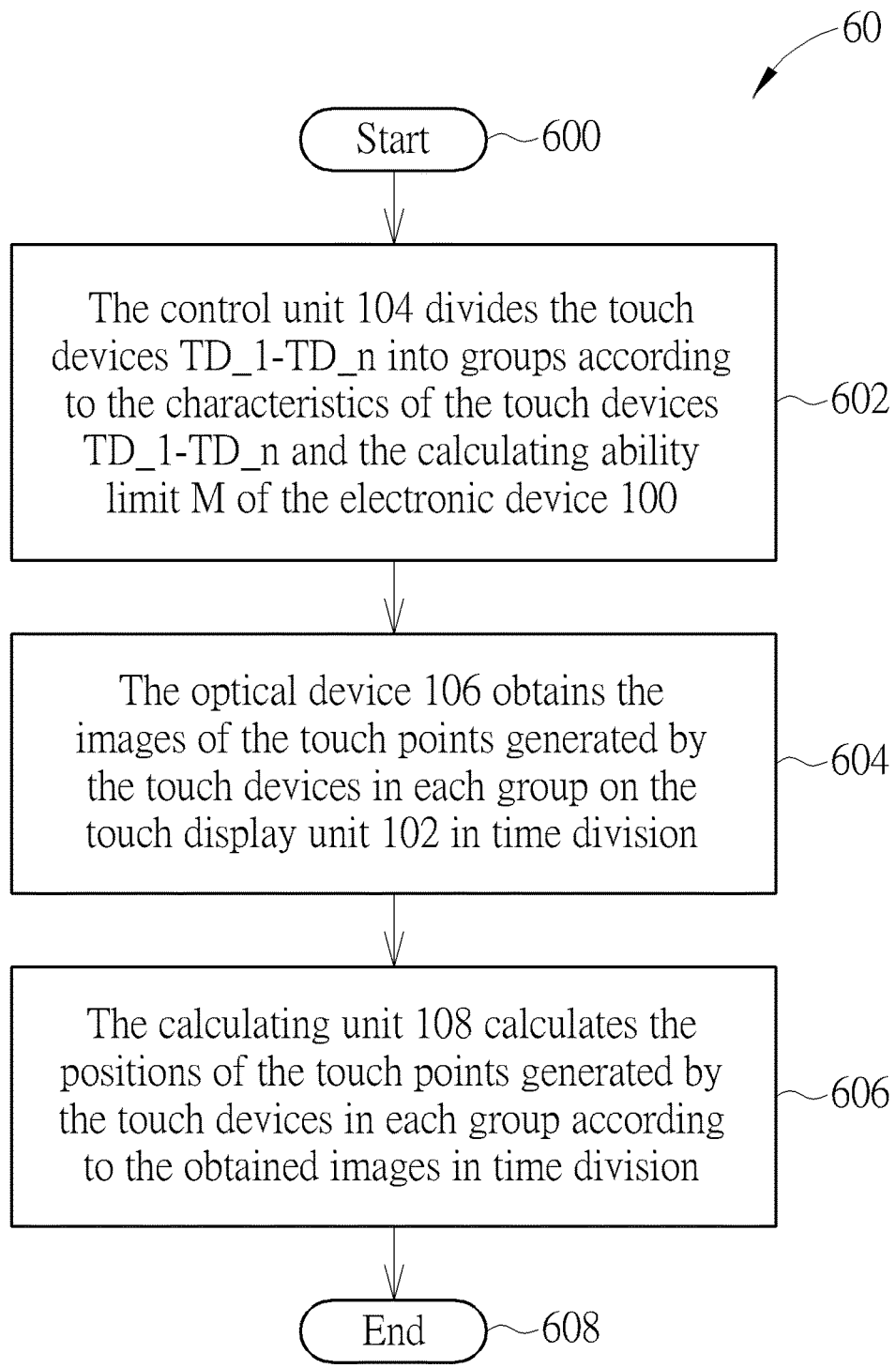
FIG. 6 is a schematic diagram illustrating a procedure of an optical touch control method for the optical touch system according to an embodiment of the present invention.

Please further refer to FIG. 5. FIG. 5 is a schematic diagram illustrating a passive operating procedure of the optical touch system 10 according to an embodiment of the present invention. In FIG. 5, the touch devices TD_1-TD_n comprise active touch devices able to be identified by the electronic device 100, passive touch devices able to be identified by the electronic device 100 and touch devices unable to be identified nor controlled by the electronic device 100 (not shown in FIG. 5), which are divided into three groups, i.e., the groups IDTF_G1, IDTF_G2 and NON_G1. Specifically speaking, the control unit 104 controls the optical device 106 to periodically obtain the images of touch points generated by the touch devices of one of the group IDTF_G1, IDTF_G2 and NON_G1 on the touch display unit 102 in time division. Subsequently, the calculating unit 108 calculates the positions of the touch points according to the obtained images of the touch points. In other words, for the active touch devices, the optical touch system 10 may perform an active or passive operation according to the characteristic of whether the touch device is able to be identified or controlled by the electronic device 100.

Besides, when the touch devices TD_1-TD_n are passive touch devices able to be identified by the electronic device 100 or touch devices unable to be identified nor controlled by the electronic device 100, because the optical touch system 10 may not control passive touch devices able to be identified by the electronic device 100 nor touch devices unable to be identified nor controlled by the electronic device 100, the optical touch system 10 in this condition also performs a passive operation. As to the cases where there are only touch devices unable to be identified nor controlled by the electronic device 100, since it is impossible to group, only the conventional optical touch technology may be applied.

In addition, active operations and passive operations may be combined, meaning that the control unit 104 can manage the operation of the active touch devices (i.e., the touch devices of the group CTL_G1 or CTL_G2) in time division and control the optical device 106 to obtain the images of the touch points generated by the touch devices able to be controlled by the electronic device 100 (i.e., the touch devices of the group CTL_G1 or CTL_G2), the active or passive touch devices able to be identified by the electronic device 100 (i.e., the touch devices of the group IDTF_G1 or IDTF_G2) and the touch devices unable to be identified nor controlled by the electronic device 100 (i.e., the touch devices of the group NON_G1) on the touch display unit 102 in time division; furthermore, the positions of the touch points associated with the images are calculated by the calculating unit 108.

Please note that the optical touch system 10 is an embodiment of the present invention. However, the present invention is not limited thereto, and those skilled in the art might make modifications or alterations accordingly. For example, the number of the touch devices in the groups shown in FIGS. 4 and 5 is merely an embodiment, and the number of the touch devices in the groups in fact depends on the characteristics and the number of the touch devices TD_1-TD_n and the calculating ability limit M of the electronic device 100. Besides, the order of operating each group shown in FIG. 5 may be arbitrarily determined by users or manufacturers. Moreover, identification of the active touch devices able to be controlled by the electronic device 100 or the active or passive touch devices able to be identified by the electronic device 100 may be set within the electronic device 100 by users or manufacturers in advance with a wireless or wired connection among the electronic device 100 and the touch devices TD_1-TD_n; alternatively, identification of the active touch devices able to be controlled by the electronic device 100 may be detected all by the electronic device 100.

The optical touch control method of the electronic device 100 mentioned above may be further summarized as a procedure 60 comprising the following steps.

Step 600: Start.

Step 602: The control unit 104 divides the touch devices TD_1-TD_n into groups according to the characteristics of the touch devices TD_1-TD_n and the calculating ability limit M of the electronic device 100.

Step 604: The optical device 106 obtains the images of the touch points generated by the touch devices in each group on the touch display unit 102 in time division.

Step 606: The calculating unit 108 calculates the positions of the touch points generated by the touch devices in each group according to the obtained images in time division.

Step 608: End.

Briefly, the procedure 60 utilizes the control unit 104 to divide the touch devices TD_1-TD_n into groups according to the characteristics of the touch devices TD_1-TD_n and the calculating ability limit M of the electronic device 100, then utilizes the optical device 106 to obtain the images of the touch points generated by the touch devices in each group in time division, and then utilizes the calculating unit 108 to calculate positions of the touch points generated by the touch devices in each group. Since the procedure 60 is performed to realize the operations of the electronic device 100, one can easily understand the details of all the principle after referring to the aforementioned illustrations.

In the prior art, operation of conventional electronic devices is limited by a number of touch devices; moreover, as the number of the employed touch devices becomes larger, the calculation becomes more complicated. In contrast, complexity of the calculating unit does not increase in the present invention by means of grouping the touch devices and dealing with the touch devices in time division.

To sum up, in order to prevent a rise in the complexity and an occurrence of calculation errors followed by the increased touch devices of the electronic device, the touch devices of the present invention are divided into groups, such that the electronic device handles the touch devices in time division to reduce calculation errors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch system, comprising:
    a plurality of touch devices; and
    an electronic device, comprising:
        a touch display unit, configured to generate a plurality of touch points when the plurality of touch devices are contacted thereon;
        a control unit, configured to divide the plurality of touch devices into a plurality of groups according to reactive characteristics of the plurality of touch devices with respect to the electronic device, so as to control or handle operations of the plurality of groups in time division, wherein the touch devices within each group have substantially the same reactive characteristics with respect to the electronic device;
        an optical device, configured to obtain images corresponding to touch points generated by touch devices in one of the plurality of groups; and
        a calculating unit, configured to receive the images obtained by the optical device to calculate positions of the touch points corresponding to the images;
    wherein the reactive characteristics of the plurality of touch devices with respect to the electronic device are whether the touch devices are controllable to be operated by the control unit or identifiable individually based on identification thereof by the electronic device;
    wherein the control unit classifies touch devices able to be controlled by the electronic device in the plurality of touch devices under a first group and classifies touch devices able to be identified by the electronic device in the plurality of touch devices under a second group.

2. The optical touch system of claim 1, wherein the plurality of touch devices are active or passive touch devices.

3. The optical touch system of claim 1, wherein the electronic device controls operations of the plurality of touch devices of the plurality of groups in time division with a wireless connection or with a wired connection.

4. The optical touch system of claim 1, wherein the control unit classifies touch devices unable to be identified by and unable to be controlled by the electronic device in the plurality of touch devices under a third group, so as to divide the plurality of touch devices into the plurality of groups according to characteristics of the plurality of touch devices.

5. The optical touch system of claim 4, wherein when a number of touch devices of the first group or a number of touch devices of the second group exceeds a calculating ability limit of the electronic device, the control unit regroups the touch devices of the first group or the touch devices of the second group according to the calculating ability limit of the electronic device.

6. The optical touch system of claim 4, wherein when a number of touch devices of the third group exceeds a calculating ability limit of the electronic device, the control unit selects touch devices from the third group according to the calculating ability limit of the electronic device, such that the number of the touch devices of the third group does not exceed the calculating ability limit of the electronic device.

7. An optical touch control method, for an electronic device of an optical touch system having a touch surface to receive a plurality of touches touching on the touch surface by a plurality of touch devices, the optical touch control method comprising:
    dividing the plurality of touch devices into a plurality of groups according to reactive characteristics of the plurality of touch devices with respect to the electronic device of the optical touch system, wherein the touch devices within each group have substantially the reactive same characteristics with respect to the electronic device;
    obtaining images corresponding to touch points generated by the plurality of touch devices in the plurality of groups on the electronic device in time division; and
    calculating positions of the touch points corresponding to the images according to the images obtained in time division;
    wherein the reactive characteristics of the plurality of touch devices with respect to the electronic device are whether the touch devices are controllable to be operated by the control unit or identifiable individually based on identification thereof by the electronic device;
    wherein the step of dividing the plurality of touch devices into the plurality of groups according to characteristics of the plurality of touch devices of the optical touch system comprises:
        classifying touch devices able to be controlled by the electronic device in the plurality of touch devices under a first group; and
        classifying touch devices able to be identified by the electronic device in the plurality of touch devices under a second group.

8. The optical touch control method of claim 7, wherein the plurality of touch devices are active or passive touch devices.

9. The optical touch control method of claim 7, further comprising controlling operations of the plurality of touch devices of the plurality of groups in time division with a wireless connection or with a wired connection.

10. The optical touch control method of claim 7, wherein the step of dividing the plurality of touch devices into the plurality of groups according to characteristics of the plurality of touch devices of the optical touch system further comprises:
    classifying touch devices unable to be identified by and unable to be controlled by the electronic device in the plurality of touch devices under a third group.

11. The optical touch control method of claim 10, further comprising when a number of touch devices of the first group or a number of touch devices of the second group exceeds a calculating ability limit of the electronic device, the control unit regroups the touch devices of the first group or the touch devices of the second group according to the calculating ability limit of the electronic device.

12. The optical touch control method of claim 10, further comprising when a number of touch devices of the third group exceeds a calculating ability limit of the electronic device, the control unit selects touch devices from the third group according to the calculating ability limit of the electronic device, such that the number of the touch devices of the third group does not exceed the calculating ability limit of the electronic device.

13. An electronic device having a touch surface to receive a plurality of touches touching on the touch surface by a plurality of touch devices, comprising:
 a touch display unit, configured to generate a plurality of touch points when the plurality of touch devices are contacted thereon;
 a control unit, configured to divide the plurality of touch devices into a plurality of groups according to reactive characteristics of the plurality of touch devices with respect to the electronic device, so as to control or handle operations of the plurality of groups in time division, wherein the touch devices within each group have substantially the same reactive characteristics with respect to the electronic device;
 an optical device, configured to obtain images corresponding to touch points generated by touch devices in one of the plurality of groups; and
 a calculating unit, configured to receive the images obtained by the optical device to calculate positions of the touch points corresponding to the images;
 wherein the reactive characteristics of the plurality of touch devices with respect to the electronic device are whether the touch devices are controllable to be operated by the control unit or identifiable individually based on identification thereof by the electronic device;
 wherein the control unit classifies touch devices able to be controlled by the electronic device in the plurality of touch devices under a first group, classifies touch devices able to be identified by the electronic device in the plurality of touch devices under a second group, and classifies touch devices unable to be identified by and unable to be controlled by the electronic device in the plurality of touch devices under a third group, so as to divide the plurality of touch devices into the plurality of groups according to characteristics of the plurality of touch devices.

14. The electronic device of claim 13, wherein the plurality of touch devices are active or passive touch devices.

15. The electronic device of claim 13, wherein the electronic device controls operations of the plurality of touch devices of the plurality of groups in time division with a wireless connection or with a wired connection.

16. The electronic device of claim 13, wherein when a number of touch devices of the first group or a number of touch devices of the second group exceeds a calculating ability limit of the electronic device, the control unit regroups the touch devices of the first group or the touch devices of the second group according to the calculating ability limit of the electronic device.

17. The electronic device of claim 13, wherein when a number of touch devices of the third group exceeds a calculating ability limit of the electronic device, the control unit selects touch devices from the third group according to the calculating ability limit of the electronic device, such that the number of the touch devices of the third group does not exceed the calculating ability limit of the electronic device.

\* \* \* \* \*